United States Patent
Thomas

(10) Patent No.: US 10,865,649 B2
(45) Date of Patent: Dec. 15, 2020

(54) GAS TURBINE ENGINE

(71) Applicant: ROLLS-ROYCE plc, London (GB)

(72) Inventor: Matthew Thomas, Bristol (GB)

(73) Assignee: ROLLS-ROYCE plc, London (GB)

( * ) Notice: Subject to any disclaimer, the term of this patent is extended or adjusted under 35 U.S.C. 154(b) by 208 days.

(21) Appl. No.: 15/467,328

(22) Filed: Mar. 23, 2017

(65) Prior Publication Data

US 2017/0306976 A1    Oct. 26, 2017

(30) Foreign Application Priority Data

Apr. 20, 2016   (GB) .................................. 1606863.7

(51) Int. Cl.
| | |
|---|---|
| F01D 5/28 | (2006.01) |
| F04D 29/32 | (2006.01) |
| F01D 5/34 | (2006.01) |
| F04D 29/38 | (2006.01) |
| F02K 3/06 | (2006.01) |

(52) U.S. Cl.
CPC ............... *F01D 5/282* (2013.01); *F01D 5/34* (2013.01); *F04D 29/324* (2013.01); *F04D 29/325* (2013.01); *F04D 29/388* (2013.01); *F02K 3/06* (2013.01); *F05D 2220/32* (2013.01); *F05D 2220/36* (2013.01); *F05D 2230/31* (2013.01); *F05D 2300/603* (2013.01);
(Continued)

(58) Field of Classification Search
CPC .... F04D 29/388; F04D 29/325; F04D 29/324; F01D 5/282; F01D 5/14; F01D 5/147; F01D 5/28–282; F01D 7/02; F01D 5/34; F05D 2300/6034; F05D 2300/603; Y02T 50/60

USPC ..................... 416/229 R, 230, 229 A
See application file for complete search history.

(56) References Cited

U.S. PATENT DOCUMENTS

| | | | | |
|---|---|---|---|---|
| 4,022,547 A | * | 5/1977 | Stanley .................. | F01D 5/282 416/230 |
| 5,279,892 A | * | 1/1994 | Baldwin ................. | B29C 70/08 442/206 |

(Continued)

FOREIGN PATENT DOCUMENTS

| | | | | |
|---|---|---|---|---|
| EP | 1681439 A1 | * | 7/2006 | ............. F01D 5/147 |
| EP | 1681439 A1 | | 7/2006 | |

(Continued)

OTHER PUBLICATIONS

Oct. 11, 2016 Search Report issued in British Patent Application No. 1606863.7.

(Continued)

*Primary Examiner* — Alexander B Comley
(74) *Attorney, Agent, or Firm* — Oliff PLC

(57) ABSTRACT

A gas turbine engine that includes a fan blade having a tip, a root, a pressure side, a suction side, a trailing edge and a leading edge, the fan blade including a laminate body defined by a plurality of plies comprising reinforcement fibres, wherein an angle of the fibres in the plies from the trailing edge to the leading edge at the suction side and/or the pressure side of the blade are arranged such that the laminate body is unbalanced so that, during rotation of the fan blade, the fan blade deforms such that a centre of mass of the blade rotates about a centre of rotation of the fan so as to move the centre of mass towards a balanced position.

14 Claims, 7 Drawing Sheets

(52) U.S. Cl.
CPC ............... *F05D 2300/6034* (2013.01); *F05D 2300/614* (2013.01); *Y02T 50/60* (2013.01)

(56) References Cited

U.S. PATENT DOCUMENTS

| | | |
|---|---|---|
| 7,896,619 B2 | 3/2011 | Hill et al. |
| 2013/0283820 A1 | 10/2013 | Muron et al. |
| 2013/0287588 A1 | 10/2013 | Shim et al. |

FOREIGN PATENT DOCUMENTS

| | | | |
|---|---|---|---|
| GB | 1328167 | * | 8/1973 |
| GB | 1328167 A | | 8/1973 |
| JP | 2001-082102 A | | 3/2001 |

OTHER PUBLICATIONS

Goeij et al.; "Implementation of bending-torsion coupling in the design of a wind-turbine rotor-blade;" Applied Energy 63; Delft, NL; Elsevier Science Ltd.; 1999; pp. 191-207.
Lake et al., "A Demonstration of Passive Blade Twist Control Using Extension-Twist Coupling;" NASA; Hampton, VA; Jun. 1992; pp. 1-10.
Nixon; "Improvements to Tilt Rotor Performance Through Passive Blade Twist Control;" NASA; Hampton VA; Apr. 1988; pp. 1-10.
Capuzzi et al.; "Structural design of a novel aerolastically tailored wind turbine blade;" Thin-Walled Structures 95; Elsevier Science Ltd.; 2015; pp. 7-15.

* cited by examiner

GAS TURBINE ENGINE

TECHNICAL FIELD

The present disclosure concerns a fan blade, a gas turbine engine, and/or a method of manufacturing a gas turbine engine.

BACKGROUND

Gas turbine engines are typically employed to power aircraft. Typically a gas turbine engine will comprise an axial fan driven by an engine core. The engine core is generally made up of one or more turbines which drive respective compressors. The fan is often driven off an additional lower pressure turbine in the engine core.

The fan comprises an array of radially extending fan blades. Fan blades may be metallic fan blades or composite fan blades. Composite fan blades generally include a body made from a fibre reinforced resin matrix, e.g. carbon fibres in a resin matrix. Generally the leading edge and the trailing edge of the fan blade are shielded and/or reinforced, for example a metallic member may be provided on the trailing and/or leading edge of the composite body.

The composite body of the fan blade is generally a laminate having a plurality of plies laid up into a stack. The laminate can be formed using a number of different methods, for example lay-up by hand or automated fibre placement (AFP). There are various types of AFP processes, including variable angle tow (VAT) lay-up (where tows are steered to vary the tow path direction) and continuous tow shearing (CTS).

The angle of the fibres of each ply can be varied, for example the fibres in one ply may be 0, 45 and/or 90 degrees, and the fibres in an adjacent ply may be −0, 45 and/or −90 degrees. The angles of the plies are selected such that the fan blade is considered to be balanced and symmetric. A fan blade is considered balanced when angle plies (that is plies other than those at 0° or 90°) occur in balanced pairs, e.g. a +45° ply is accompanied by a −45° ply. A fan blade is considered to be symmetric when one or more ply angles through the thickness of the laminate are symmetric about a mid-surface of the laminate, e.g. an outermost ply on a suction side and a pressure side of a blade is 45°. Fan blades are designed to be symmetric and balanced to avoid coupling, for example extension-twist coupling and bend-twist coupling.

Fan blades are designed so as to either satisfy strength and displacement requirements at cruise, or are designed as a compromise between the strength and displacement requirements at take-off and cruise.

Generally, fan blades have a twisted shape for aerodynamic purposes. When the fan blades are rotating at a high speed, centrifugal and aerodynamic loads can cause the fan blades to untwist. U.S. Pat. No. 7,896,619 is concerned with ensuring that the blades remain twisted during both take off and cruise by providing an antisymmetric straight fibre laminate.

SUMMARY

The present disclosure recognises that it is desirable to have different fan blade geometry at different operating conditions, for example different geometry at take-off compared to cruise. For example, it can be desirable to have a greater angle of attack relative to incoming air at take-off, and/or the optimum relative air angle to be different at take-off than at cruise.

The present disclosure relates to achieving variable fan blade geometry. It may be considered that the present disclosure is concerned with passively achieving variable fan blade geometry. In the present disclosure, the fibre angle of one or more plies defining a fan blade body are selected so as to promote deformation of a fan blade during operation in a gas turbine engine. Deformation is achieved by modifying the ply lay-up to produce stiffness coupling effects.

According to a first aspect there is provided a fan blade for a gas turbine engine. The fan blade has a tip, a root, a pressure side and a suction side. The fan blade comprises a laminate body defined by a plurality of plies comprising reinforcement fibres. The angles of the fibres in the plies are arranged such that the laminate body is unbalanced. That is, the plies of the laminate in at least one local region of the laminate are unbalanced.

An unbalanced laminate is understood in the art to be a laminate having angle plies (i.e. plies other than those at 0° and 90°) that occur in unbalanced pairs, that is a ply is not accompanied by a negation of itself. In exemplary embodiments of the present disclosure the angle of the fibres of a ply vary from root to tip of the blade, in such examples, an unbalanced laminate is understood to be a laminate where at one or more local positions the plies are unbalanced (i.e. the plies do not occur in balanced pairs at one or more locations of the laminate).

The angle of the fibres in the plies at the suction side and/or the pressure side of the blade may be arranged such that the laminate body is unbalanced. For example, the ply that defines the suction surface of the blade may be unbalanced with a ply that defines the pressure surface of the blade.

The fan blade may be unbalanced (i.e. inertially unbalanced). An unbalanced fan blade is understood in the art. Conventionally fan blades are designed to be balanced so as to minimise the bending moment acting on the blade due to the combination of centrifugal forces and aerodynamic pressure during use of the fan blade in a gas turbine engine.

The fan blade may be unbalanced (i.e. inertially unbalanced) such that during rotation of the fan blade, when the fan blade forms part of a fan of a gas turbine engine, the fan blade deforms such that the centre of mass of the blade rotates about a centre of rotation of the fan so as to move the centre of mass towards a balanced position.

The fibres in one or more of the plies at the pressure side and one or more plies at the suction side may be arranged so as to define a non-symmetric laminate.

A non-symmetric laminate is understood in the art to be a laminate where the fibre angle of one or more plies through the thickness of the laminate are not symmetric about a mid-surface of the laminate (i.e. a surface positioned equidistant from the suction surface as from the pressure surface). In exemplary embodiments of the present disclosure the angle of the fibres of a ply varies, in such examples, a non-symmetric laminate is understood to be a laminate where at one or more local positions the plies are not symmetric about a mid-surface of said local position.

The fibres in one or more of the plies at the pressure side and one or more plies at the suction side may be arranged to be anti-symmetric.

The plies at the pressure side and the suction side may be arranged such that the blade is substantially symmetric in a region proximal to the root and non-symmetric (e.g. anti-symmetric) in a region proximal to the tip.

The angle of the fibres of the plies at the pressure and suction side may vary from root to tip of the blade.

The fibres of one or more plies (e.g. one or more plies at the suction side and/or the pressure side) may be arranged such that the angle of the fibres continuously varies from the root of the blade to the tip of the blade.

The direction of the fibres of the plies at the pressure side and at the suction side of the blade may vary according to a curve. A plurality of fibre paths may be defined. Each fibre path may be curved. The curve may be based on a datum curve, e.g. a datum curve defined using a baseline piecewise quadratic Bezier curve.

The fibre direction of the plies on the pressure side may have a positive angle in a region near the root of the blade. Alternatively, the fibre direction of the plies on the pressure side may have a negative angle in a region near the root of the blade.

The fibre direction of the plies on the suction side may have a positive angle in a region proximal the root of the blade. Alternatively, the fibre direction of the plies on the suction side may have a negative angle in a region proximal the root of the blade.

The fibre direction of the plies at the suction side may have a negative angle proximal to the tip of the blade. Alternatively, the fibre direction of the plies at the suction side may have a positive angle proximal to the tip of the blade.

The fibre direction of the plies at the pressure side may have a negative angle proximal to the tip of the blade. Alternatively, the fibre direction of the plies at the pressure side may have a positive angle proximal to the tip of the blade.

In exemplary embodiments, the fibre direction of the plies at the suction side may have a negative angle and/or the fibre direction of the plies on the pressure side of the blade may have a positive angle proximal to the tip of the blade.

The blade may comprise an inner region between the plies at the suction side and at the pressure side.

The inner region may be defined by a plurality of plies, optionally, the plurality of plies may be arranged to be balanced and symmetric.

The direction of the fibres of the plies of the inner region may have a direction of substantially 0 degrees from the root to the tip of the blade.

The inner region may have a thickness equal to or between 30% and 70%, e.g. 50%, of the thickness of the blade.

According to a second aspect there is provided a fan blade for a gas turbine engine. The fan blade has a tip, a root, a pressure side and a suction side. The fan blade comprises a laminate body defined by a plurality of plies comprising reinforcement fibres. The angle of the fibres in the plies at the pressure side and the suction side are arranged such that the laminate body is non-symmetric. The direction of the reinforcement fibres in the plies at the pressure side and the suction side continuously varies from the root to the tip of the blade.

The fan blade of the second aspect may have one or more of the optional features of the fan blade of the first aspect.

According to a third aspect there is provided a gas turbine engine comprising the fan blade according to the first and/or the second aspect.

According to a fourth aspect there is provided a method of manufacturing a fan blade.

The method may comprise laying up a plurality of plies so as to define a laminate. The method may further comprise varying the fibre direction within the laminate such that the laminate is unbalanced.

The method may comprise defining the plies and the fibre direction of the plies using a pre-preg tape.

The plies may be laid up using automated fibre placement, for example variable angle tow or continuous tow shear.

The fan blade may be the fan blade of the first and/or the second aspect.

According to a fifth aspect there is provided a method of manufacturing a fan blade. The method comprises laying up a plurality of plies so as to define a laminate, and varying the angle of the fibres in the plies at the pressure side and the suction side such that the laminate body is non-symmetric. The direction of the reinforcement fibres in the plies at the pressure side and the suction side continuously varies from the root to the tip of the blade. For example, an automated fibre placement method may be used and the plies may be formed by laying tape with a varying angle from the root to a tip of a blade.

The fan blade may be the fan blade of the first and/or the second aspect.

According to a sixth aspect there is provided a method of manufacturing a composite fan blade for a gas turbine engine for an aircraft. The composite fan blade includes a laminate having a plurality of stacked plies. The method comprises designing the plies of the laminate such that the laminate is unbalanced so as to promote deformation of the fan blade when used under take off conditions compared to when used under cruise conditions.

The fan blade may be the fan blade of the first and/or the second aspect.

According to a seventh aspect there is provided a method of manufacturing a composite fan blade for a gas turbine engine for use on an aircraft. The composite fan blade includes a laminate having a plurality of stacked plies. The method comprises designing the plies of the laminate such that the laminate is non-symmetric, and selecting the angle of the fibres of the plies and the extent of non-symmetry to achieve a first configuration of blade under take off conditions and a second configuration of the blade under cruise conditions.

The angle of the fibres and the extent of non-symmetry of the plies may be selected so as to utilise change in temperature between take off and cruise, and/or the difference in forces (e.g. centrifugal and/or aerodynamic forces) acting on the blade.

The fan blade may be the fan blade of the first and/or the second aspect.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

DESCRIPTION OF THE DRAWINGS

Embodiments will now be described by way of example only, with reference to the Figures, in which.

DETAILED DESCRIPTION

Figure 1:
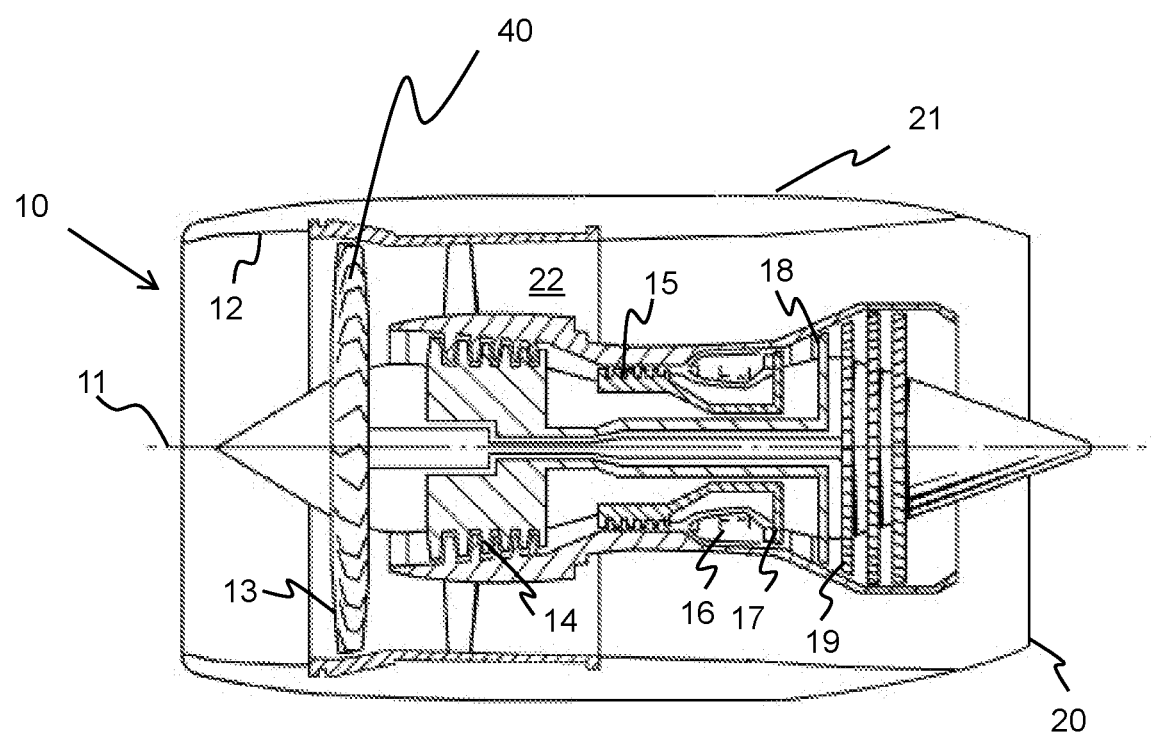
FIG. 1 is a sectional side view of a gas turbine engine.

With reference to FIG. 1, a gas turbine engine is generally indicated at 10, having a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, an intermediate pressure turbine 18, a low-pressure turbine 19 and an exhaust nozzle 20. A nacelle 21 generally surrounds the engine 10 and defines both the intake 12 and the exhaust nozzle 20.

The gas turbine engine 10 works in the conventional manner so that air entering the intake 12 is accelerated by the fan 13 to produce two air flows: a first air flow into the intermediate pressure compressor 14 and a second air flow which passes through a bypass duct 22 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high 17, intermediate 18 and low 19 pressure turbines drive respectively the high pressure compressor 15, intermediate pressure compressor 14 and fan 13, each by suitable interconnecting shaft.

Other gas turbine engines to which the present disclosure may be applied may have alternative configurations. By way of example such engines may have an alternative number of interconnecting shafts (e.g. two) and/or an alternative number of compressors and/or turbines. Further the engine may comprise a gearbox provided in the drive train from a turbine to a compressor and/or fan.

The intake fan 12 comprises an array of radially extending fan blades 40 that are mounted to the shaft. The shaft may be considered a hub at the position where the fan blades 40 are mounted.

Figure 2:
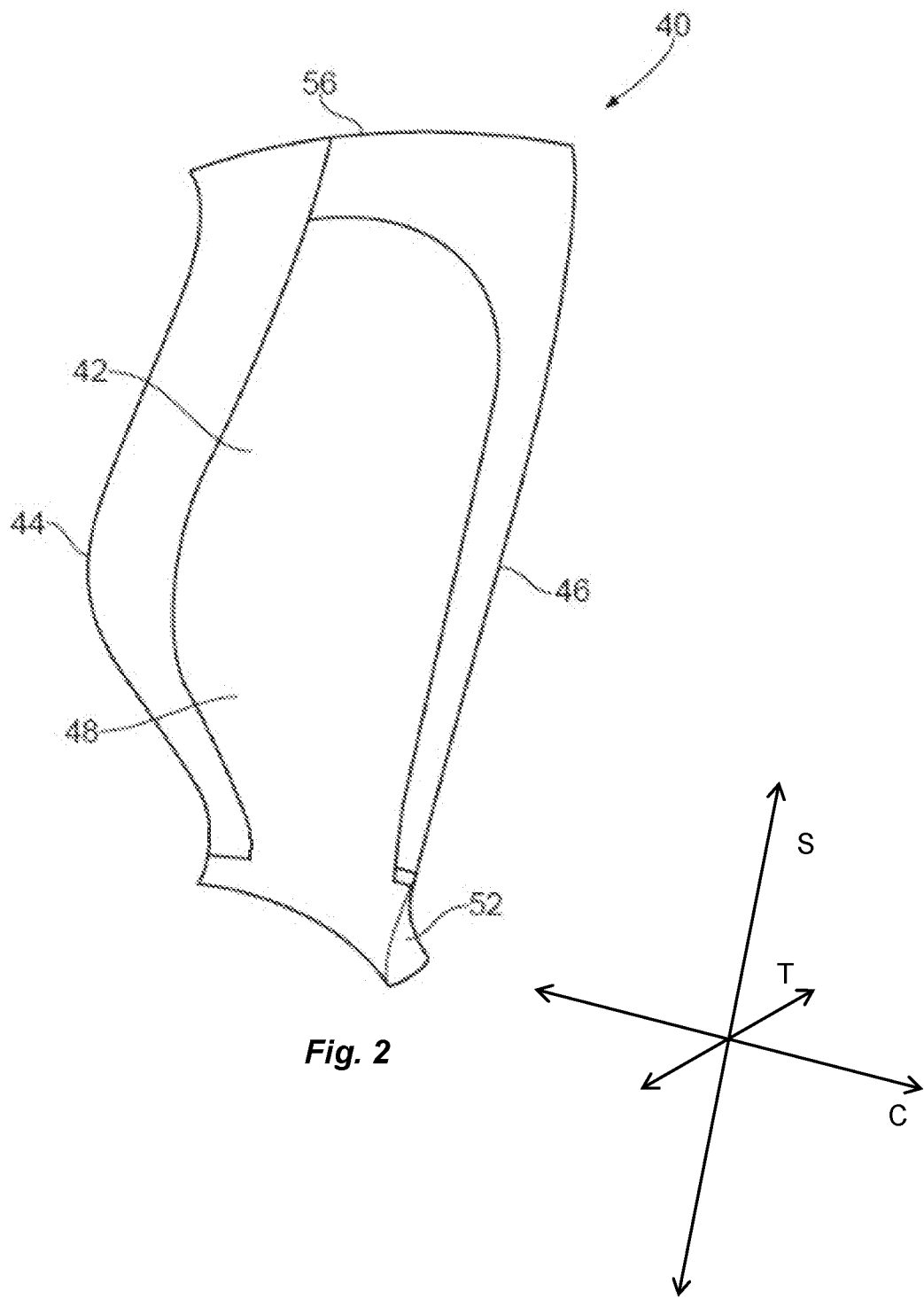
FIG. 2 is a schematic of a fan blade of the gas turbine engine of FIG. 1.
Figure 3:
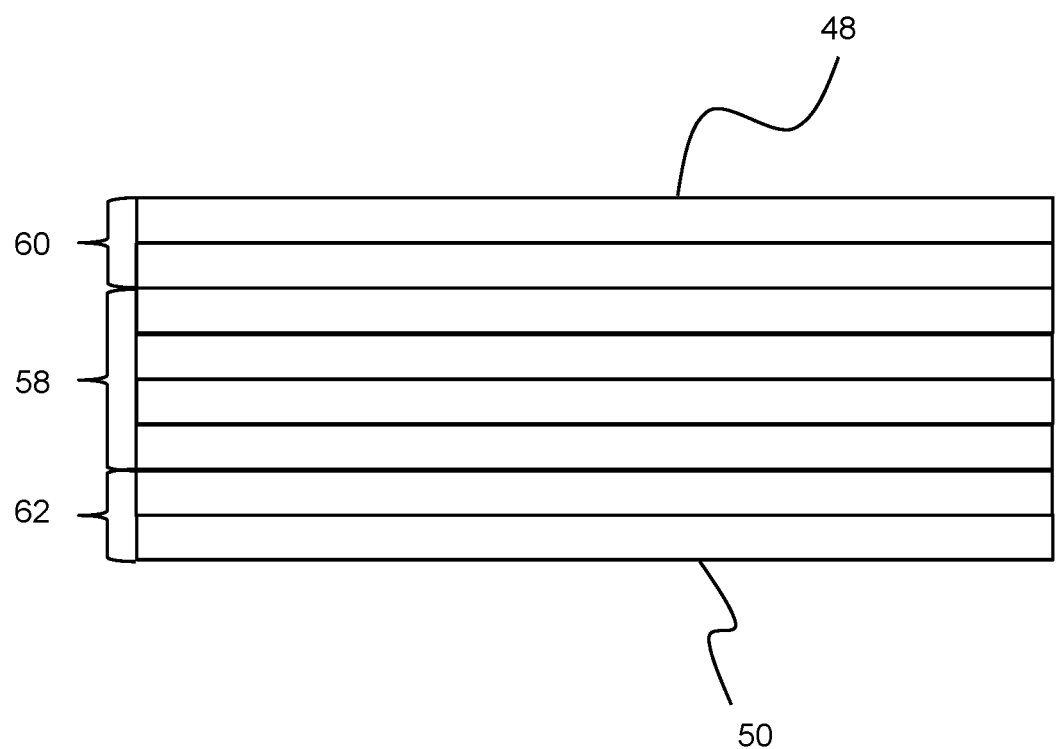
FIG. 3 is a schematic sectional view of a section of a laminate body of the blade of FIG. 2.

Referring to FIG. 2, the fan blades 40 each comprise an aerofoil portion 42 having a leading edge 44, a trailing edge 46, a concave pressure surface 48 extending from the leading edge to the trailing edge on a pressure side of the blade and a convex suction surface extending from the leading edge to the trailing edge on a suction side of the blade. The fan blade has a root 52 via which the blade can be connected to the hub. The fan blade has a tip 56 at an opposing end to the root.

In the present application, as is conventional in the art, a chordwise direction C is a direction that extends from the leading edge 44 to the trailing edge 46 of the blade. A spanwise direction S is a direction that extends from a root 52 to a tip 56 of the blade. A thickness direction T is a direction that extends from the pressure surface 48 to the suction surface of the blade.

The fan blade includes a metallic leading edge and a metallic trailing edge. The remainder of the blade (e.g. the body of the blade) is made from composite material, in this example a fibre (e.g. carbon fibre) reinforced resin matrix. The blade body is defined by a laminate having a plurality of plies stacked together.

In the present example, the laminate body of the blade is manufactured using an automated fibre placement (AFP) technique. Such techniques are known in the art so will not be explained in detail here, but generally pre-preg tape is used to define the ply. Once the plies have been defined and built up to form the laminate, the laminate is then optionally de-bulked. The laminate is then cured, for example in an autoclave. The AFP technique used in this example is variable angle tow (VAT) lay-up. Methods of VAT lay-up are well understood in the art. In VAT lay-up the angle of the pre-preg tape can be varied along the blade (e.g. in a spanwise and/or a chordwise direction) so as to vary the angle of the fibres.

Referring now to FIGS. 3 to 5C, the laminate includes one or more plies proximal to the pressure side of the blade, e.g. one of said plies defining a pressure surface 48 of the blade. The laminate also includes one or more plies proximal to the suction side of the blade, e.g. one of said plies defining a suction surface 50 of the blade. The laminate further includes one or more plies defining an inner region 58 that is provided between the pressure side plies 60 and the suction side plies 62.

Figure 4A:
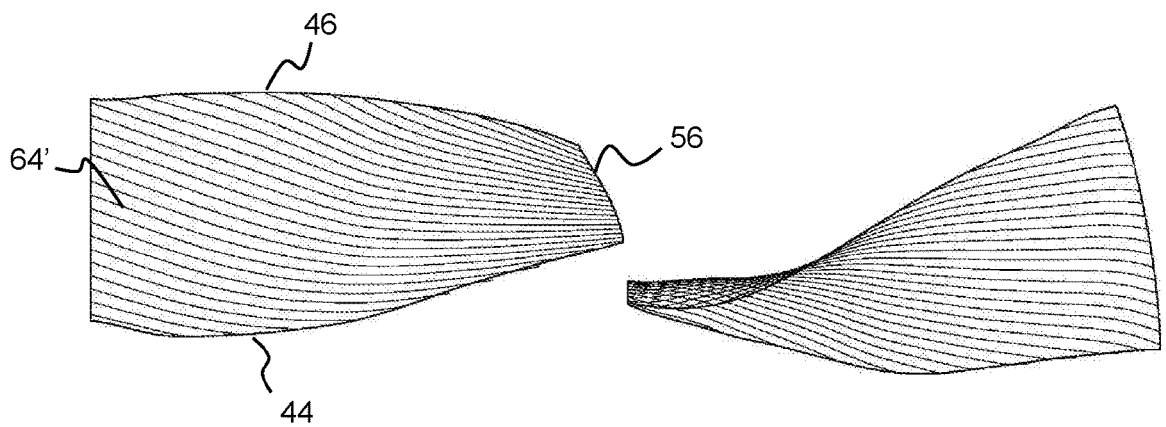
FIG. 4A is a plan and side view of exemplary fibre paths of a ply that is proximal to a suction side of the blade of FIG. 2.
Figure 4B:
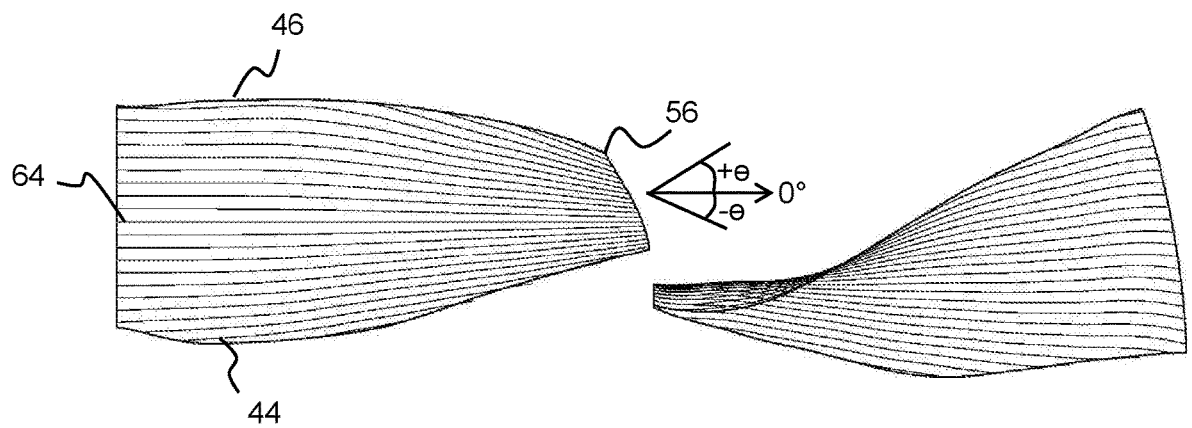
FIG. 4B is a plan and side view of exemplary fibre paths of a ply that is provided in an inner region of the blade of FIG. 2.
Figure 4C:
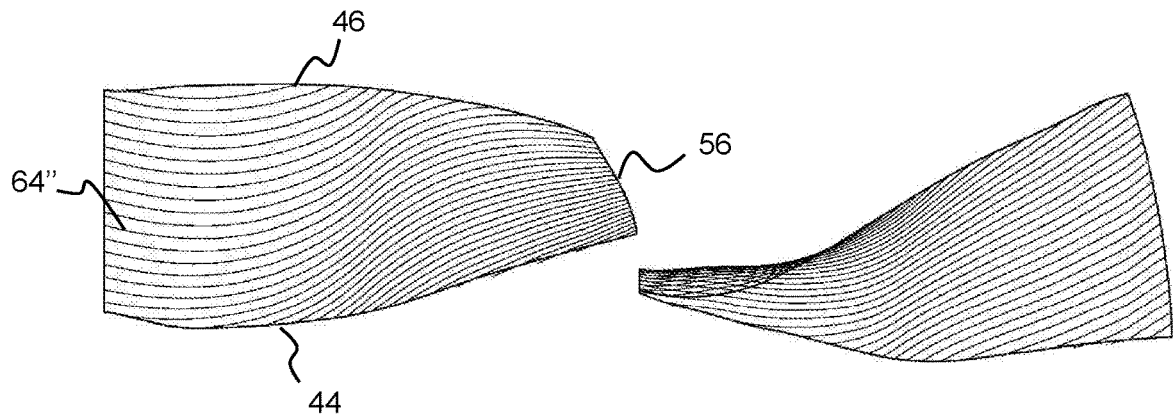
FIG. 4C is a plan and side view of exemplary fibre paths of a ply that is proximal to a pressure side of the blade of FIG. 2.
Figure 5A:
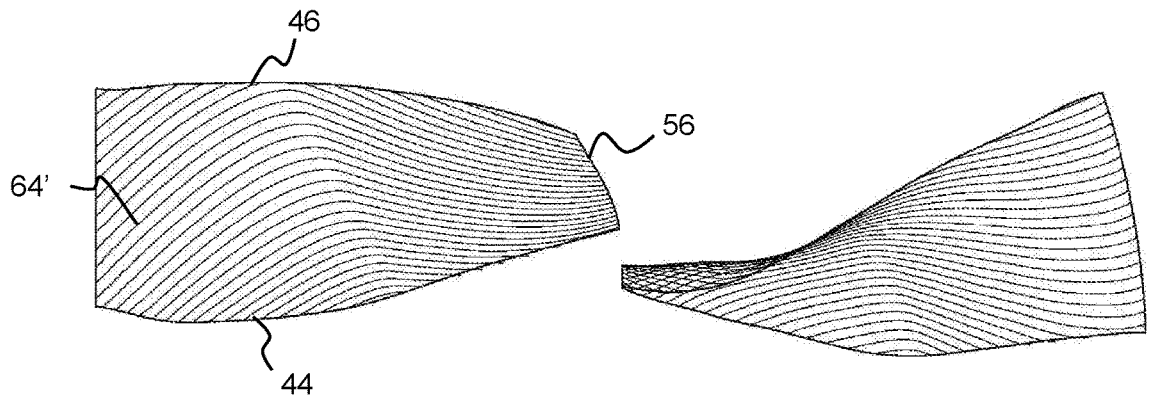
FIG. 5A is a plan and side view of alternative exemplary fibre paths of a ply that is proximal to a suction side of the blade of FIG. 2.
Figure 5B:
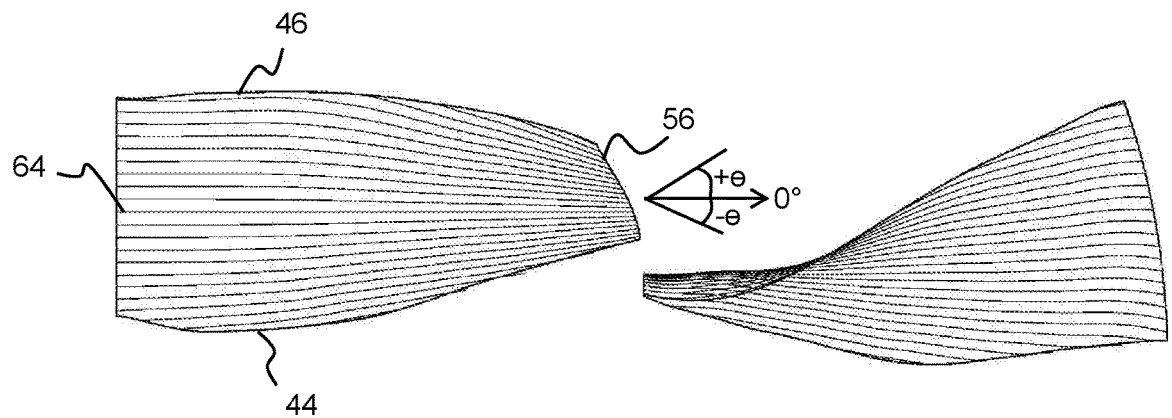
FIG. 5B is a plan and side view of alternative exemplary fibre paths of a ply that is provided in an inner region of the blade of FIG. 2.
Figure 5C:
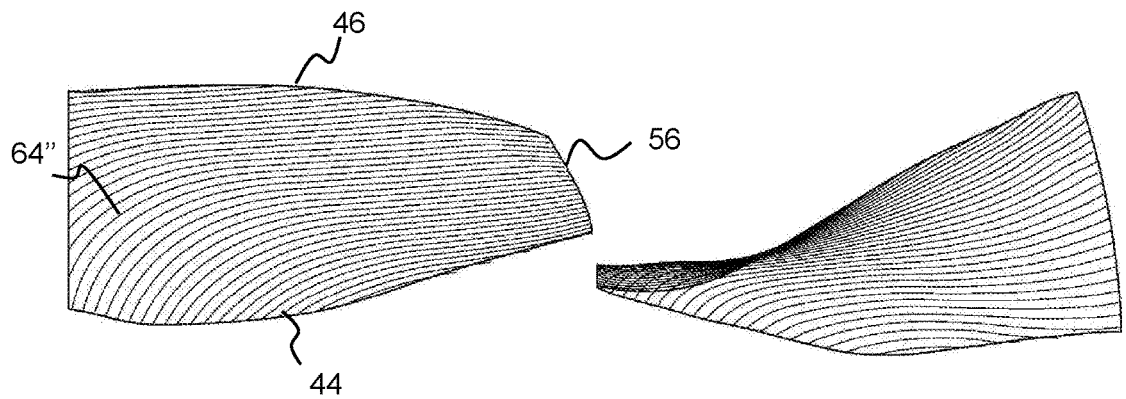
FIG. 5C is a plan and side view of alternative exemplary fibre paths of a ply that is proximal to a pressure side of the blade of FIG. 2.

The blade illustrated in FIGS. 4A to 4C is designed for optimal performance when experiencing centrifugal loads, and the blade illustrated in FIGS. 5A to 5C is designed for optimal performance when experiencing centrifugal and pressure loads.

The plies that define the inner region 58 are arranged for carrying in-plane loads and for strength during operation of the blade in a gas turbine engine. The inner region 58 also acts as a spacer between the pressure side plies 60 and the suction side plies 62.

As can be seen in FIGS. 4B and 5B, the majority of the fibres of the plies of the inner region are directed towards the tip of the fan blade. Contours are provided on the blades to indicate the fibre direction, one of the contours (a datum line 64) between the trailing edge and the leading edge of the blade is substantially straight, that is, directed at 0 degrees from the root of the blade to the tip of the blade. The remainder of the directional contours are also substantially straight (compared to the plies of the suction side and the pressure side, as will be described later), but there is some curvature to account for the narrower chord length of the blade in the region of the tip of the blade.

In the present application, as is conventional in the art, the direction of the plies is defined with respect to a direction at 0 degrees that extends directly from the root to the tip of the blade.

Referring to FIGS. 4A and 4C the pressure side plies and the suction side plies are arranged such that the angle of the fibres of each ply continuously varies from the root of the blade to the tip of the blade. In the present example, the direction of the plies is defined using a curved datum line 64', 64", which in this example is defined by a piecewise quadratic Bezier curve.

The suction side plies and the pressure side plies are arranged so that the laminate defining the blade body is unbalanced about its centre in a through-thickness direction, i.e. about a mid-surface of the laminate, the mid-surface being equidistant from the outermost ply on the pressure side and the outermost ply on the suction side. The provision of plies that are unbalanced means that the blade will exhibit bend-twist coupling.

The thickness of the fan blade varies in a spanwise and/or chordwise direction. In the present example, the thickness variation of the fan blade is selected such that the fan blade is unbalanced (i.e. inertially unbalanced). That is, during rotation of the fan blade, when the fan blade forms part of a fan of a gas turbine engine, the fan blade deforms such that the centre of mass of the blade rotates about a centre of rotation of the fan so as to move the centre of mass towards a balanced position. In the present example, the centre of mass of the blade is offset from a neutral plane of the blade. This means that large bending moments are produced at the root of the blade and these bending moments reduce towards the tip of the blade.

Referring to FIGS. 4A to 4C, the pressure side plies and the suction side plies are non-symmetric. In this example, the pressure side plies and the suction side plies are anti-symmetric in a region proximal to the tip of the blade. In particular, the fibres of the pressure side plies and the suction side plies are substantially symmetric in a region proximal to a root of the blade. As the path of the fibres progresses towards the tip of the blade, the fibres start to deviate from a symmetrical relationship to an anti-symmetric relationship in a region near (or at) the tip of the blade.

In the present example, the pressure side plies have a positive average fibre angle (along the span of the plies) and the suction side plies have a negative average fibre angle (along the span of the plies).

As described previously, the angle of the fibres of the pressure side plies and the suction side plies varies (in this example continuously varies) in a spanwise direction, such that the suction side and pressure side plies, and therefore the laminate, are unbalanced. Further, in the present example the difference in direction between the fibres of the pressure side plies and the suction side plies is greater at the tip of the blade than at the root of the blade.

In exemplary embodiments, the pressure side plies ($\theta_1$) and suction side plies ($\theta_2$) fibre angles proximal to the root will be in the region of $0° \leq \theta_1 \leq 60°$ and $-20° \leq \theta_2 \leq 60°$. Towards the tip the fibre angles for the pressure side plies ($\theta_1$) and suction side plies ($\theta_2$) will change to within the range of $10° \leq \theta_1 \leq 60°$ and $-20° \leq \theta_2 \leq 0$.

The fibre paths of the suction side and pressure side plies are arranged such that there is increased bend-twist coupling towards the root (that is the plies are substantially symmetric in a region proximal to the root). This is because in the region proximal to the root the primary loading on the blade is an aerodynamic pressure loading. Towards the tip of the blade the primary loading is centrifugal loading, and as such the fibre direction of the plies is arranged so as to increase the extension-twist coupling and reduce the bend-twist coupling (that is the plies are non-symmetric towards the tip of the blade).

The thickness of the inner region can be adapted to modify the coupling effects; the greater the distance of the suction side plies and the pressure side plies from the thickness mid-plane of the blade the greater the stiffness coupling. In the present example, 50% of the thickness of the blade is defined by the inner region. However, in alternative embodiments the thickness of the inner region may be altered, for example it may be equal to or between 30% and 70%, e.g. greater than or equal to 40% and/or less than or equal to 60%.

Referring now to FIGS. 5A to 5B, an alternative fan blade is illustrated. In this blade design, bend-twist coupling will be dominant near the root because the fibres of the pressure side plies and the fibres of the suction side plies follow a similar path near the root (i.e. are substantially symmetric near the root).

As will be appreciated by the person skilled in the art, the exact arrangement of plies will depend upon the forces experienced by a blade in a given application. For example, the optimal fibre direction for the plies may be a design that is a compromise between the blade of FIGS. 4A to 4C and the blade of FIGS. 5A to 5C.

The angle of the fibres and the variation of the fibre angle in a spanwise direction for each ply can be defined as a function of the blade loading during operation (e.g. centrifugal loading, gas loading, and/or thermal loading), the thickness and/or the fibre direction of the plies of the inner region of the blade, and the desired geometry during operation, for example the desired geometry at rest, during take-off and during cruise. Since the geometry of the blade varies in a spanwise, chordwise, and thickness direction, the optimal angle of the fibres is defined locally, such that the angle of the fibres change along the blade (for example in a spanwise and/or a chordwise direction).

Figure 6:
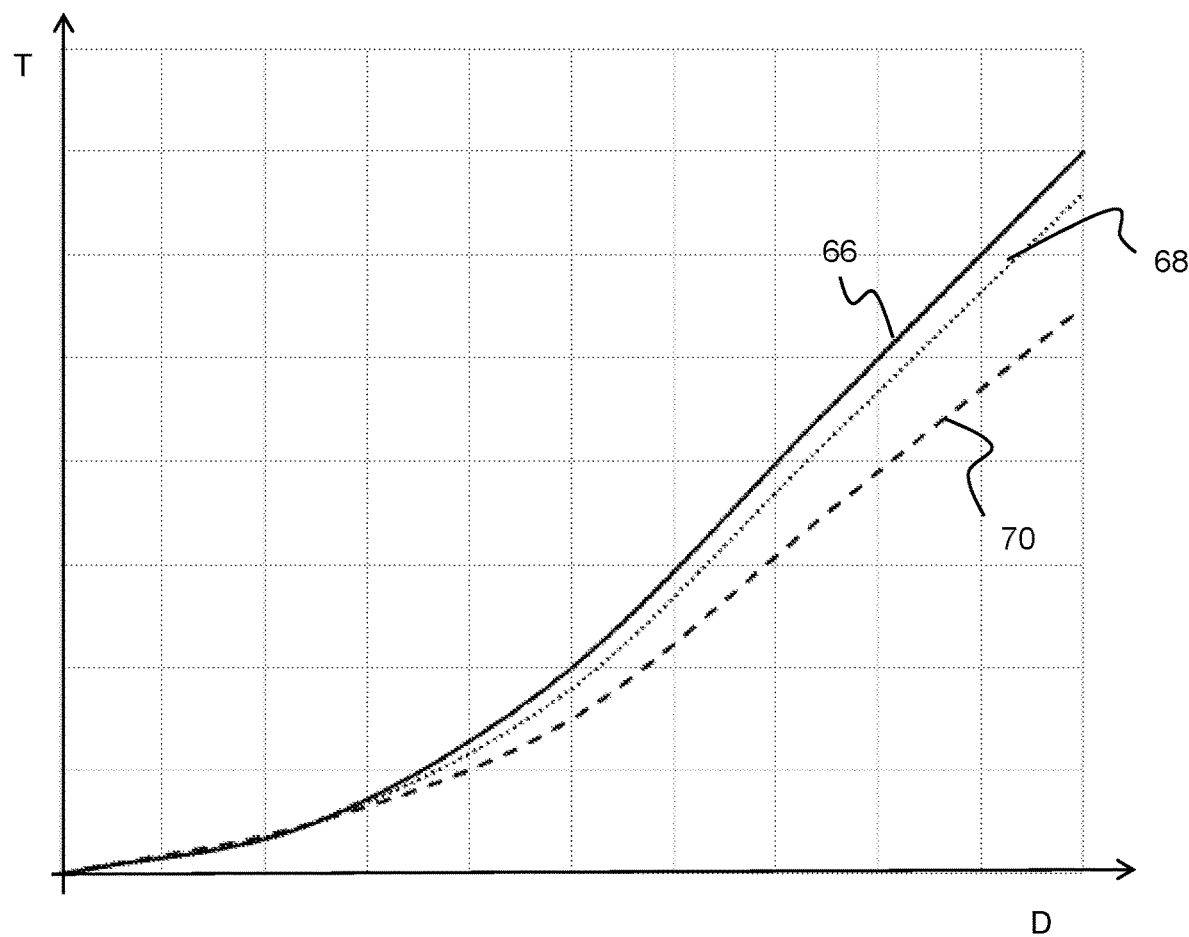
FIG. 6 is a graph illustrating blade twist angle (T) against distance (D) along the blade span for a blade having the ply arrangement of the present disclosure at cruise, take-off, and when stationary; and FIG. 7A

As illustrated in FIG. 6, the use of non-balanced and/or non-symmetric plies (as described above) means that during operation of the blade in a gas turbine engine, the blade can passively change shape to geometry that is more suitable for a given operating condition. In the example in FIG. 6, the blade increases the amount of untwist during take-off. The solid line 66 indicates the blade twist angle when the blade is stationary, the small dotted line 68 indicates the blade twist angle during cruise, and the larger dotted line 70 indicates the blade twist angle during take-off.

The present inventors have recognised that the angle of the fibres of the ply lay-up can be selected so that the laminate defining the blade body is unbalanced and/or non-symmetrical, so as to promote deformation of the fan blade during operation of a gas turbine engine. This can be beneficial because the blade can have optimal geometry so as to realise for example, a greater angle of attack relative to incoming air at take-off and/or the relative air angle at take-off can be lower than at cruise.

The desired combination of extension-twist, bend-twist and/or extension-bend coupling is achieved by selecting the required angle of the fibres in the laminate stacking sequence. For example if a force is applied in the 0 degree direction, extension-twist coupling is solely produced by the stacking sequence being anti-symmetric (in a very simplified two ply laminate this could be for example 30 degrees/−30 degrees) about a central through thickness location of the laminate. Bend-twist is produced by the stacking sequence being symmetric but unbalanced (in a very simplified two ply laminate this could be for example 30 degrees/30 degrees).

An additional coupling that can be achieved is extension-bend coupling. Extension-bend coupling is produced by the fibres of the plies about the central through thickness region (for example the suction surface and the pressure surface plies) being orthogonal with one another (for example 0 degrees/90 degrees).

It is possible to achieve extension-twist, bend-twist and extension-bend coupling using a combination of the above described ply arrangements, for example in a simplified two ply laminate this could be achieved by having the fibres of one ply at 60 degrees and the fibres of the other ply at −30 degrees.

To design the fibre paths that will be optimal for a given blade, an optimiser can be used in combination with methods such as finite element analysis and/or computational fluid dynamic analysis. In the present disclosure, the design intent is to maximise the difference in blade twist angle between running conditions of interest (for example at take-off and cruise).

In the present example, the fibre path of each of the suction side plies and the pressure side plies are defined using a datum curve. The datum curve is then shifted using techniques known in the art, to create the rest of the contour curves. The datum curve is defined using a piecewise quadratic Bezier curve, for example using a method similar to that described in section 2.3 of "Continuous tow shearing for manufacturing variable angle tow composites, B. C. Kim, K. Potter, P. M. Weaver, Composites Part A: Applied Science and Manufacturing. 43 (2012) 1347-1356". In this example shifting (e.g. iterative shifting) has been described as a method of defining the contours from the datum line, but in alternative embodiments the contour lines may be arranged to be parallel.

An optimiser, finite element analysis, and/or computational fluid dynamics can be used to select the optimal thickness of the inner region. In exemplary embodiments, a genetic algorithm (e.g. an evolutionary optimiser) may be used to select the optimal fibre paths.

In the present example plies define the inner region of the blade, but it will be appreciated that the inner region may be defined in a number of different ways, for example using a three dimensionally woven core, or a metallic, plastic or composite structure, for example a structure that defines a hollow core of the blade. In the described example the plies defining the inner region are straight fibre plies, but in alternative embodiments the plies may include angled fibres, for example variable angled fibres, and/or the fibres of one or more of the plies of the inner region may have a different angle to the fibres of one or more of the remaining plies. The angle of the pressure side and suction side plies may be selected to account for the structure and/or material of the inner region.

Figure 7A:
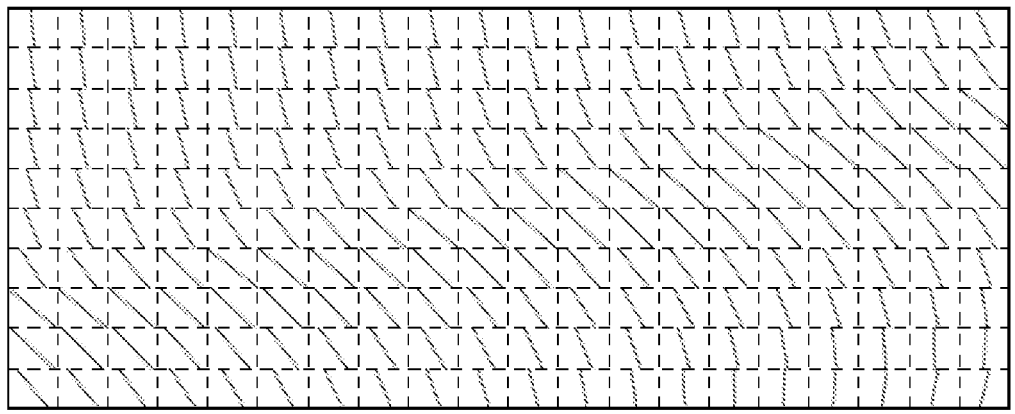
FIG. 7B is a further alternative example of a fibre path for a ply proximal to a suction side of a blade and a ply proximal to the pressure side of the blade, respectively.
Figure 7B:
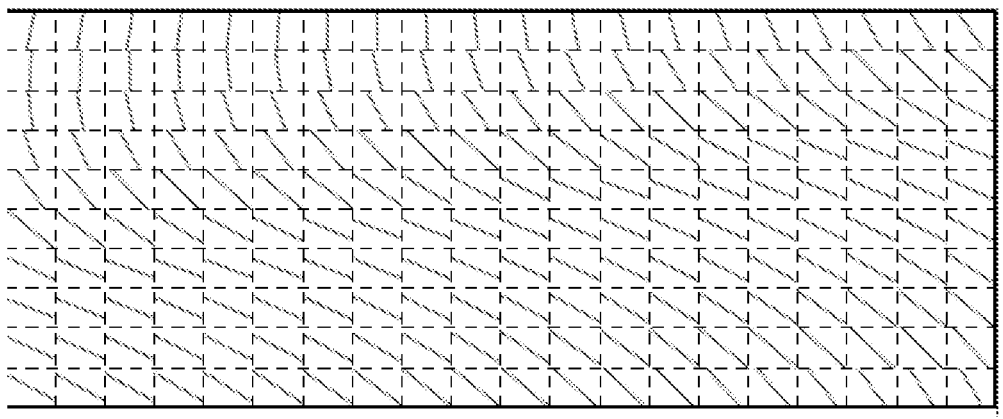

In the present disclosure, the fibre paths have been described as continuous, but in alternative embodiments the fibre paths may be discontinuous, for example the path may be defined using a plurality of straight fibre paths, as illustrated in FIGS. 7A and 7B. However, in terms of manufacturability and strength a continuous fibre path is preferred.

In the described examples, the design of the blade has been optimised by considering the centrifugal and/or aerodynamic loads on the blade. However, the deformation of the blade can be further optimised by designing the laminate structure such that the change in temperature between take off and cruise is utilised to passively optimise the geometry of the blade. Non-symmetric laminates have unbalanced thermal expansion in the laminate due to the difference in thermal expansion of the fibre and matrix material. This unbalanced thermal expansion can cause the laminate to warp (twist and/or bend). As such, the laminate can be designed to utilise the change in temperature between take-off and cruise to promote increased blade twist during cruise.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A gas turbine engine comprising
a fan blade having a tip, a root, a pressure side, a suction side, a trailing edge and a leading edge, the fan blade comprising:
a laminate body defined by a plurality of plies comprising reinforcement fibres, wherein:
an angle of the fibres in the plies from the trailing edge to the leading edge at the suction side and the pressure side of the fan blade are arranged such that the laminate body is unbalanced from the trailing edge to the leading edge so that, during rotation of the fan blade, the fan blade deforms such that a centre of mass of the fan blade rotates about a centre of rotation of the fan blade so as to move the centre of mass towards a balanced position,
the fan blade comprises an inner region defined by a plurality of plies between the plies at the suction side and at the pressure side, and
when at a state of rest, the angle of the fibres of the plies at the pressure side and the suction side continuously varies from the root to the tip of the fan blade and the plurality of plies of the inner region are arranged to be balanced and symmetric and a direction of the fibres of the plies of the inner region is substantially 0 degrees relative to a radial axis of the fan blade from the root to the tip of the fan blade.

2. The gas turbine engine according to claim 1, wherein the fibres in the plies at the pressure side and/or the suction side are arranged so as to define a non-symmetric laminate.

3. The gas turbine engine according to claim 2, wherein the fibres in the plies at the pressure side and/or the suction side are arranged to be anti-symmetric.

4. The gas turbine engine according to claim 1, wherein the plies at the pressure side and/or the suction side are arranged such that the fan blade is symmetric in a region proximal to the root and non-symmetric in a region proximal to the tip.

5. The gas turbine engine according to claim 1, wherein a fibre direction of the plies on the pressure side and/or the suction side of the fan blade have a positive or a negative angle in a region near the root of the fan blade.

6. The gas turbine engine according to claim 1, wherein a fibre direction of the plies at the suction side has a negative angle and/or a fibre direction of the plies on the pressure side of the fan blade has a positive angle proximal to the tip of the fan blade.

7. The gas turbine engine according to claim 1, wherein the inner region has a thickness between 30% and 70% of an overall blade thickness.

8. A method of manufacturing a fan blade of the gas turbine engine according to claim 1, the method comprising laying up a plurality of plies so as to define a laminate, and varying the fibre direction within the laminate such that the laminate is unbalanced.

9. The method according to claim 8, comprising defining the plies and the fibre direction of the plies using a pre-preg tape.

10. The method according to claim 9, wherein the plies are laid up using automated fibre placement.

11. A gas turbine engine comprising
a fan blade comprising a tip, a root, a pressure side, a suction side, a trailing edge and a leading edge, the fan blade comprising:
a laminate body defined by a plurality of plies comprising reinforcement fibres, wherein:
an angle of the fibres in the plies from the trailing edge to the leading edge at the pressure side and the suction side are arranged such that the laminate body is non-symmetric from the trailing edge to the leading edge,
the fan blade comprises an inner region defined by a plurality of plies between the plies at the suction side and at the pressure side, and
when at a state of rest, a direction of the reinforcement fibres in the plies at the pressure side and the suction side continuously varies from the root to the tip of the fan blade and the plurality of plies of the inner region are arranged to be balanced and symmetric and a direction of the fibres of the plies of the inner region is substantially 0 degrees relative to a radial axis of the fan blade from the root to the tip of the fan blade.

12. A method of manufacturing a composite fan blade for a gas turbine engine, the composite fan blade including a laminate having a plurality of stacked plies, and the fan blade including a tip, a root, a pressure side, a suction side, a trailing edge and a leading edge, the method comprising:
designing the plies of the laminate such that the laminate is unbalanced from the trailing edge to the leading edge so as to promote deformation of the fan blade when used under take off conditions compared to when used under cruise conditions,
wherein, when at a state of rest, an angle of fibres of the plies at the pressure side and the suction side continuously varies from the root to the tip of the fan blade and a plurality of plies of an inner region between the plies at the suction side and at the pressure side are arranged to be balanced and symmetric and a direction of the fibres of the plies of the inner region is substantially 0 degrees relative to a radial axis of the fan blade from the root to the tip of the fan blade.

13. The method according to claim 12, comprising designing the plies of the laminate such that the laminate is non-symmetric, and selecting the angle of the fibres of the plies and the extent of non-symmetry to achieve a first configuration of fan blade under take off conditions and a second configuration of the fan blade under cruise conditions.

14. The method according to claim 13, wherein the angle of the fibres and the extent of non-symmetry of the plies is selected so as to utilise change in temperature between take off and cruise, and/or the difference in forces acting on the fan blade.

* * * * *